United States Patent [19]

Lee

[11] 4,106,486
[45] Aug. 15, 1978

[54] COOKING UTENSIL
[76] Inventor: B. Paul Lee, 15400 E. 14th Pl., Aurora, Colo. 80011
[21] Appl. No.: 662,509
[22] Filed: Mar. 1, 1976
[51] Int. Cl.² .............................................. A47J 27/04
[52] U.S. Cl. ..................................... 126/369; 99/403; 99/450; 220/6; 220/409
[58] Field of Search .......... 99/413, 319, 355, 410–411, 99/412, 414, 449, 450; 126/369, 357, 367, 380, 377; 220/4, 6, 7, 317

[56]  References Cited
U.S. PATENT DOCUMENTS

| 136,588 | 3/1873 | Collins | 126/369 |
|---|---|---|---|
| 266,974 | 11/1882 | Cox | 220/7 |
| 1,276,749 | 8/1918 | George | 99/412 |
| 2,040,004 | 5/1936 | Kelsay | 126/369 |
| 2,588,614 | 3/1952 | Capra et al. | 99/410 |
| 2,593,392 | 4/1952 | Budlane et al. | 99/411 X |

FOREIGN PATENT DOCUMENTS

| 440,131 | 7/1912 | France | 220/7 |
|---|---|---|---|
| 685,799 | 3/1965 | Italy | 220/7 |
| 974,203 | 11/1964 | United Kingdom | 220/17 |

Primary Examiner—Harvey C. Hornsby
Assistant Examiner—Timothy F. Simone
Attorney, Agent, or Firm—Richard D. Law

[57]  ABSTRACT

A perforated, inner pan nests completely within an outer non-perforated open top pan and a cover encloses the opening of the outer pan and contained inner pan. The opposed ends of the perforated pan are hinged so as to open flat in the plane of pan's bottom, and handles on the hinged ends provide manipulation of the inner pan without opening.

6 Claims, 5 Drawing Figures

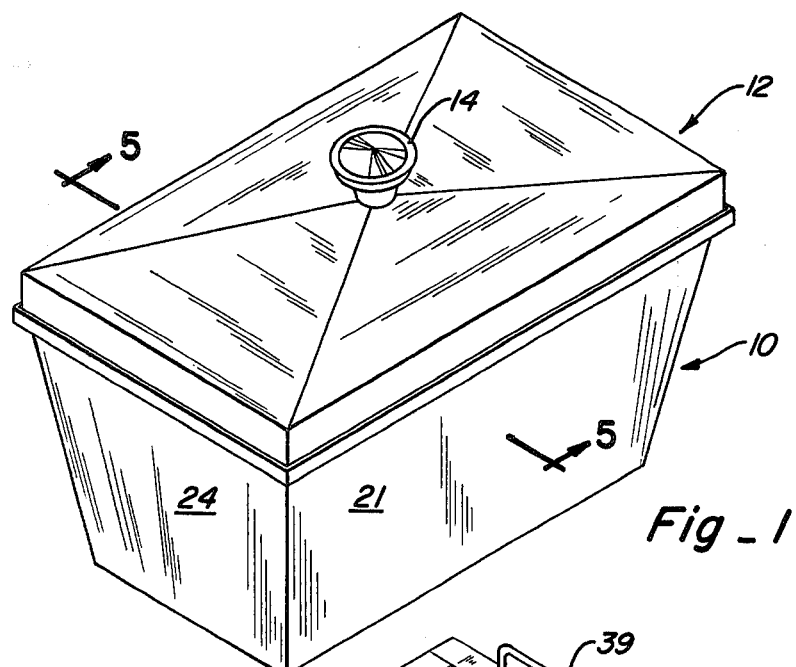
Fig_1
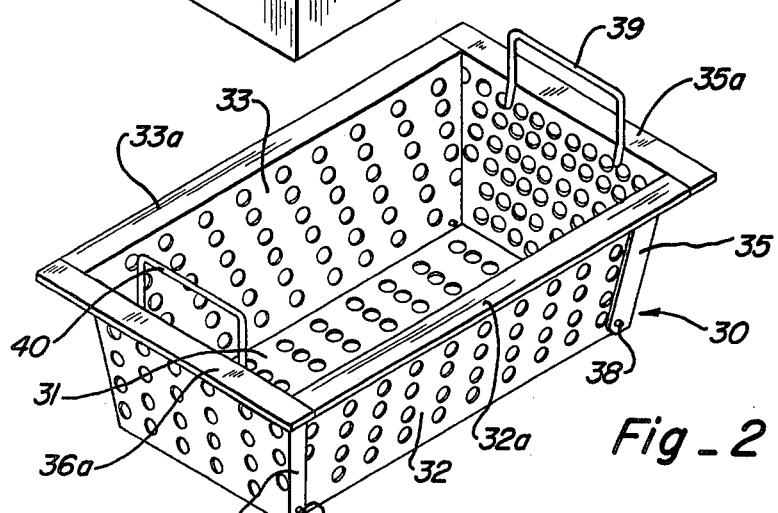
Fig_2
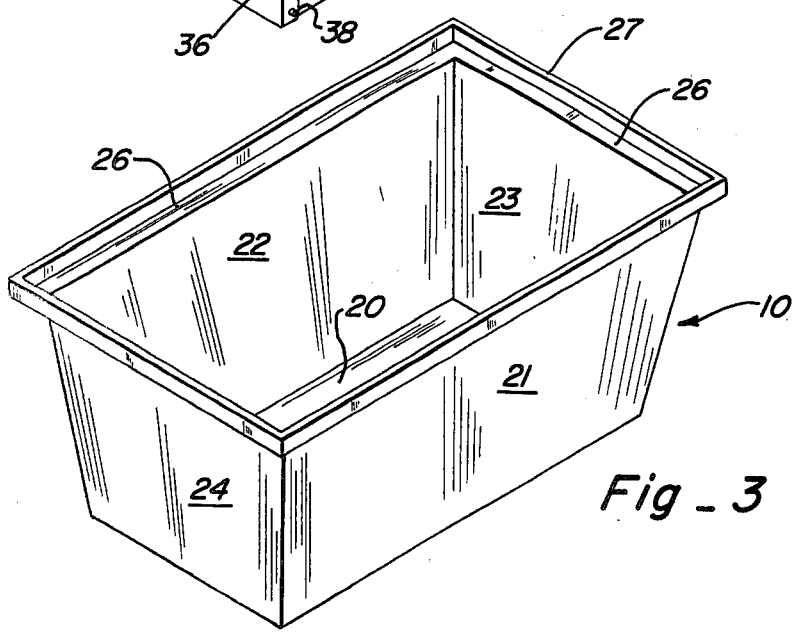
Fig_3

COOKING UTENSIL

This invention relates to cooking utensils, particularly to a cooking pan for oven or stove top cooking with a nesting perforated pan and an enclosing cover.

PRIOR ART

Nesting cooking utensils are known in the art, however, they normally have an inner pan with only a bottom portion which is perforated, and which is arranged to set in the outer pan. For example, Geribaldi et al. U.S. Pat. No. 1,488,150 of Mar. 25, 1924 shows a steaming pan, of a typical double boiler configuration; with the top pan setting on the lower pan and the inner pan having a perforated bottom. Each section has its own extending handle from the pan's exterior. The top pan does not nest completely in the bottom pan.

The George U.S. Pat. No. 1,276,749 of Aug. 27, 1918 shows nesting boiler with a closely fitting inner pan so that bulges on the inner pan rest on inward bulges of the outer pan holding the inner pan elevated for draining contents. The top of the inner pan rests on outer pan and is exposed, but provides a resting place for the cover.

The Wiegel U.S. Pat. No. 2,555,720 of June 6, 1951 shows a large outer pan having a small inner perforated pan for resting on the bottom of the outer pan or resting on the top of the outer pan for steaming or draining. The inner pan has an upwardly existing handle for holding the inner pan on the upper lip of the outer pan. A low pressure steam cooker is shown in O'Reilly U.S. Pat. No. 3,489,975 of Jan. 13, 1970, wherein an inner perforated pan has an outwardly extending lip which rests on the rolled top of outer pan. A cover fits in an annular rise in the extending lip. Steam pressure escapes under the lip during cooking. Double inner perforated pans rest one on the other in an outer electric cooker, shown in Herbrand et al, U.S. Pat. No. 3,859,505 of Jan. 7, 1975. The lower inner pan rests on the bottom of the electric pan. This is obviously a steamer or boiler type cooker.

GENERAL DISCUSSION OF THE INVENTION

According to the present invention, there is provided an outer pan, preferably of rectangular construction having an outwardly extending flanged ledge. A perforated pan, having an extending ledge for resting on the bottom pan ledge within the upstanding flange. A cover fits in the outer pan's upstanding flange so that any condensate in the cover flows back into the outer pan. The inner pan is perforated and its bottom is supported substantially above the bottom of the outer pan. The inner pan includes hinged ends for ease of food removal.

Included among the objects and advantages of the invention is to provide resting cooking utensils for oven cooking and/or stove top cooking.

Another object of the invention is to provide covered, resting cooking utensils arranged for all condensate to flow into the outer pan.

Still another object of the invention is to provide a completely enclosed inner perforated pan in an outer pan with a cover producing a tight cooking assembly for roasting, steaming etc.

Yet another object of the invention is to provide a cooking assembly having an outer pan having an outwardly extending ledge and an upstanding flange for supporting an inner pan and a cover therein to prevent loss of fluids from the cooking.

An additional object of the invention is to provide a cooking assembly with inner and outer pans, and the inner pan having opposed hinged ends for opening the same permitting easy removal of contained food in the pan.

GENERAL DISCUSSION OF THE DRAWINGS

These and other objects and advantages of the invention may be ascertained by reference to the following description and appended illustrations in which:

FIG. 1 is a perspective of a closed cooking assembly according to the invention.

FIG. 2 is a perspective view of an inner perforated pan of a cooking assembly according to the invention.

FIG. 3 is a perspective view of an open top, outer pan of a cooking assembly according to the invention.

SPECIFIC DISCUSSION OF THE DRAWINGS

Figure 4:
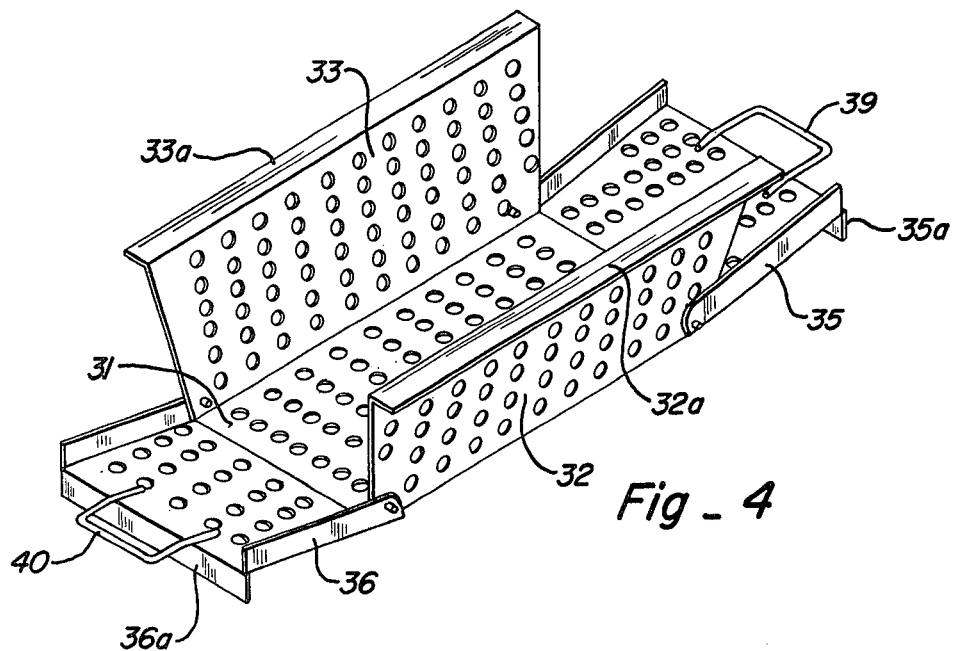
FIG. 4 is a perspective view of the inner cooking pan of the assembly with the hinged ends in generally open position.

In general the device of the invention includes a rectangular generally open top outer pan, a perforate inner pan sitting down into the outer pan but providing a substantial distance between the bottom of the inner pan and the bottom of the outer pan and a cover for the outer pan and closing the inner pan. The outer pan is arranged with the cover to provide that any condensation flows back into the bottom pan.

The cooking assembly, shown in FIG. 1, includes the outer, bottom pan shown generally by numeral 10 and the cover shown in general by numeral 12. The cover 12 includes an manipulating handle 14, preferably of metal or the like so that the entire pan may be placed in an oven.

The outer pan 10 is an open top pan, which is otherwise imperforate, of a general rectangular configuration with inwardly slopping sides from top to bottom. The pan includes a bottom 20, opposing sides 21 and 22, and ends 23 and 24. All of these members are secured together to provide an imperforate pan. The top is provided with an outwardly extending flange 26 which provides a shoulder completely around the opening to the pan, and an upstanding flange or wall 27 extends completely around the shoulder 26. The shoulder 26 provides seating for an inner pan, shown in general by numeral 30 of FIG. 2. The inner pan includes a perforate bottom 31, and opposed sides 32 and 33 which are similarly perforated to permit draining of fluids and entrance of steam through the holes. The opposed ends of the inner pan are fitted with hinged ends 35 and 36; hinged by means of pivot pins 38 to the respective lower corner of the assembly. The ends include handles, and the handle 39 is secured to the inside of end 35 and the handle 40 is secured to the inside of the end 36. Each side is provided with an outwardly extending ledge which is arranged to seat on the shoulder 26 of the outer pan and securely hold the inner pan in position in the outer pan. The side 32 includes outwardly extending flange 32a and the side 33 includes outwardly extending flanges 33a. The pivotal ends 35, likewise, include outstandng flanges. End 35 includes its outstanding flange 35a and the end 36 includes its outstanding flange 36a.

As shown in FIG. 4, the inner pan is arranged with its ends pivoted downwardly, opening up the pan providing easy access to an- food contained in the pan, and provides easy removal of such foods or cutting the foods held in the pan. The inner pan is arranged so that when it is lifted from the outer pan by means of the handles 39 and 40 the inner pan retains its generally closed configuration.

Figure 5:
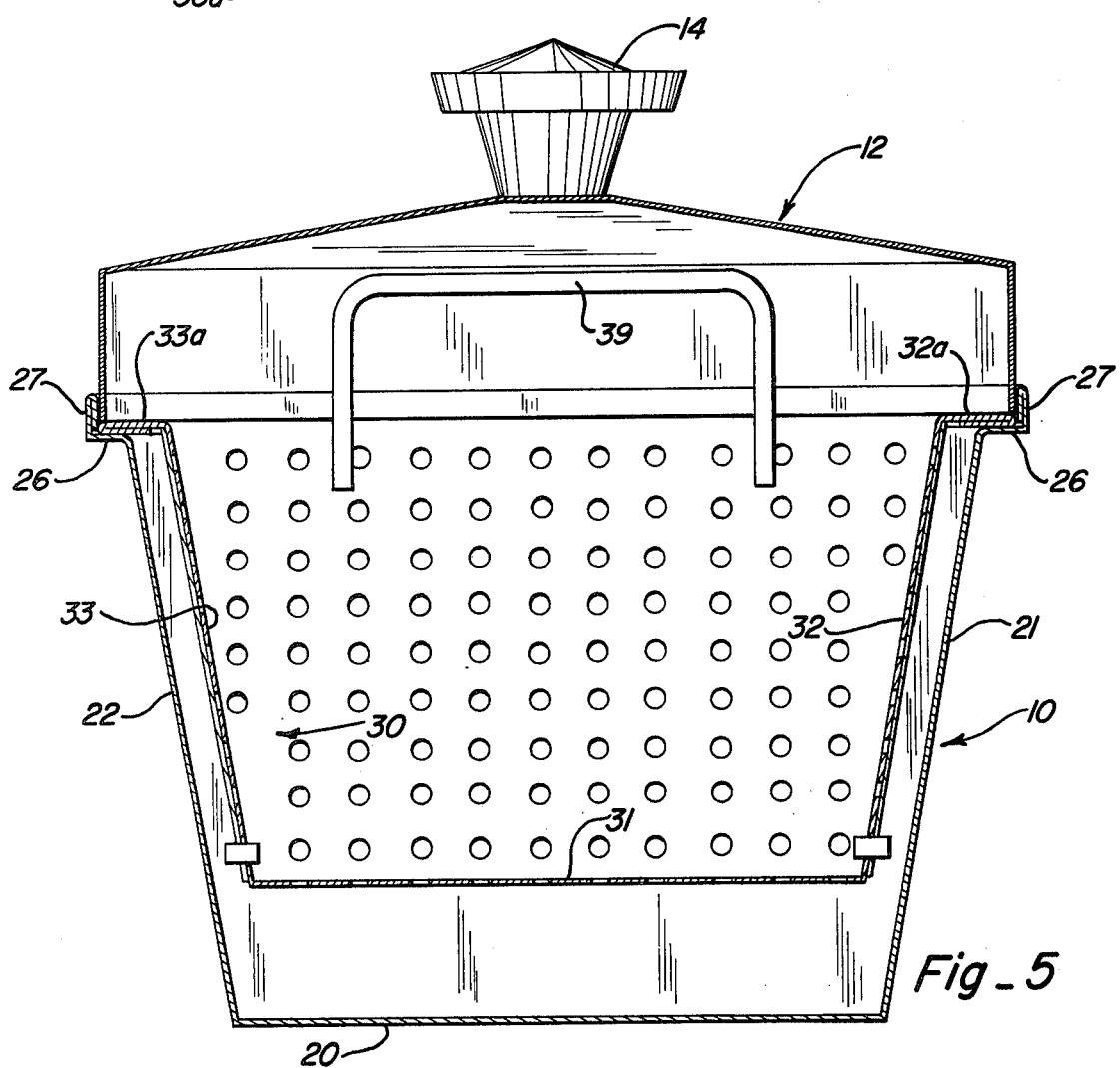
FIG. 5 is a side elevational view, in cross section, of the cooking assembly of the invention.

The assembly of the unit is shown in FIG. 5, with the inner pan 30 seated with its ledge on the ledge 26 inside the upstanding flange 27. The perforate bottom 31 is spaced above the perforate bottom 30 of the outer pan. The sides of the inner pan are spaced from the sides of the outer pan. This provides sufficient space for liquid in the outer pan without entering the inner pan. The perforations on the inner pan 30 provide means for draining liquid from the food in the inner pan, and, also, provides means for passing steam into the food in the inner pan. The cover 12, also, fits inside the upstanding flange 27 so that any condensation on the inside of the cover flows down the slopped top of the cover to the edges, and through the inner pan, back into the pan 10.

The assembly is preferably made of stainless steel or a coated high grade carbon steel, and is formed with fairly close tolerances. In one very effective size the outer pan is formed with a 10½ inch long maximum length of the outer flange and a 6¾ maximum width of the top flange, and is about 3¾ inch deep from the shoulder 26. The inner pan has the dimensions of 9¼ inches long and 5¾ inches wide, with the ledge extending approximately ½ inch on each side and end. The inner pan is made about 3 inches deep providing about three-fourths of an inch depth between the outer pan and the bottom of the inner pan.

The pan of the invention provides several important features, including excellent cooking of meat where the grease flows from the food and is caught in the bottom pan away from the meat. This makes for succulent gravy. Another important feature is the steaming qualities of the pan which permits food held on the inner pan to be thoroughly steamed by means of the perforations all around the food. The ends of the inner pan, when opened, permit the user to move the roast, meat loaf or other items onto a carving dish or the like as the case may be. In actual uses it has been found that the pan is excellent for cooking meat loaves with a greaseless consistancy, and such other foods as stuffed peppers, or meat balls or various meat loaves, and the like so that the grease is permitted to drain from the food as it cooks. Also, meat such as roasts, fowl, wild game and the like are readily cooked in the pan which permits the draining of the grease from the food. As a steamer, the assembly can accommodate steaming of such foods as weiners, seafood, puddings, rolls and other breads, corn-on-the-cob, cabbage and the like. The ability of the pan to catch the grease and other liquids which flow from the food being cooked provides liquids which would make excellent gravy for the food being cooked. While the pan is primarily intended for overn cooking it may be readily used for top of the stove cooking, either as a steamer or a baker.

What is claimed is:

1. A cooking pan assembly comprising:
(a) an outer generally rectangular, open top pan having an outwardly extending shoulder peripherally around the edge of the opening and an upstanding flange on the outer edge of said shoulder;
(b) an inner, generally rectangular, open top pan having perforated sides, perforated ends and a unitary perforated bottom, wherein the sides are fixed to the bottom to form a fixed U-shaped channel, and the ends are pivotally hinged adjacent the bottom for movement from a closed position abutting the edges of the U-channel to an outwardly extending position for food removal, and an outwardly extending shoulder sized to seat on said shoulder on the outer pan and inside said upstanding flange, wherein said bottom is substantially spaced from said outer pan in its nesting position, and wherein said perforations in said inner pan are sufficiently large for free passage of liquids and steam and sufficiently small to support food in said inner pan;
(c) handle means fixed to and extending upwardly from each of said ends, whereby when the inner pan is lifted by said handle means, the ends tend to remain closed against the edges of the U-shaped channel because the ends are pivotally hinged to the U-shaped channel at locations adjacent the bottom; and
(d) cover means including sloped top portions from about the center to the sides thereof, said cover being sized and shaped to seat on said shoulder of the inner pan and in said upstanding flange, whereby said inner pan is completely enclosed and condensate from said cover flows into said outer pan.

2. A cooking pan assembly according to claim 1, wherein:
the sides and ends of said outer pan slope inwardly from the top edge and the sides and ends of the inner pan are similarly sloped and arranged to be spaced from the sides and ends of the outer pan in nesting position.

3. A cooking pan assembly according to claim 1, wherein:
said handle means on said inner pan are fixed, loop-type handles.

4. A cooking pan assembly according to claim 1, wherein:
said assembly is formed of stainless steel arranged for oven cooking and stove top cooking.

5. A cooking pan assembly according to claim 1, wherein:
said pivotally hinged ends include opposed pivot pins extending from the sides of said inner pan at both ends thereof, and
said ends include opposed bores telescoped over said pins.

6. A cooking pan assembly according to claim 5, wherein:
said ends of said inner pan include normal flanges aligned with the inner pan's sides and extendable thereover, whereby said pivot pins extend through said normal flanges.

* * * * *